SATURABLE MAGNETIC CORE CIRCUITS

Filed Sept. 12, 1958 5 Sheets-Sheet 1

Inventors:
André M. Richard
Jean Brodin
By Ralph B. Stewart, atty.

SATURABLE MAGNETIC CORE CIRCUITS

Filed Sept. 12, 1958 5 Sheets-Sheet 2

Inventors
Andre M. Richard
Jean Brodin
By Ralph B. Stewart
attorney

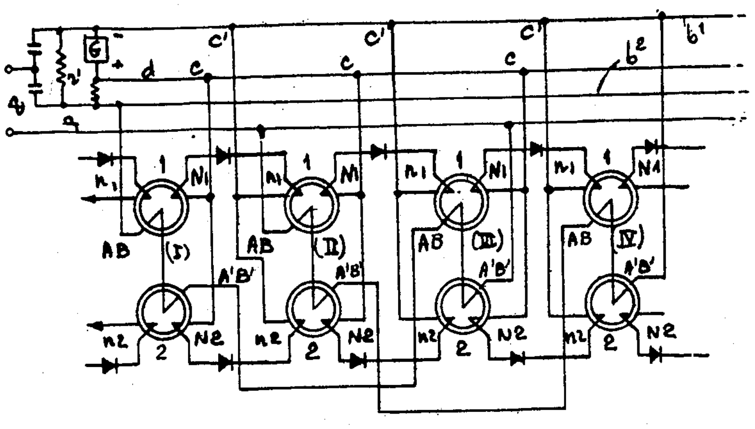
FIG. 21
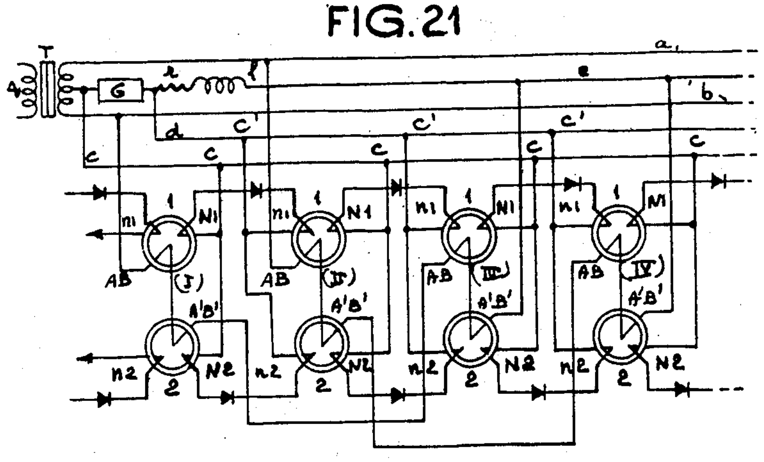
FIG. 22
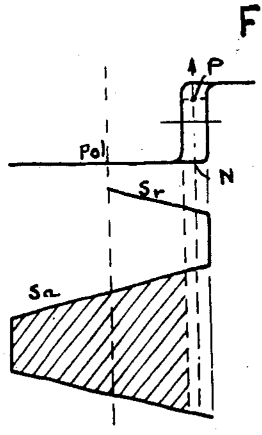
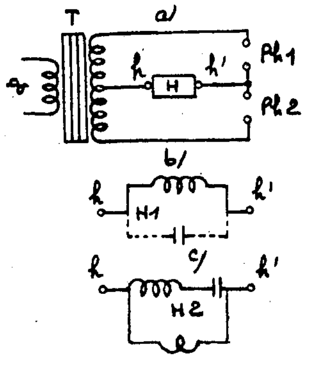
FIG. 23 FIG. 24
Inventors
Andre M. Richard
Jean Brodin
By Ralph B. Stewart
attorney Inventors
Andre M. Richard
Jean Brodin
By Ralph B. Stewart
attorney

SATURABLE MAGNETIC CORE CIRCUITS

Filed Sept. 12, 1958 5 Sheets-Sheet 5

Inventors
Andre M. Richard
Jean Brodin
By Ralph B. Stewart
Attorney

United States Patent Office 3,144,639
Patented Aug. 11, 1964

3,144,639
SATURABLE MAGNETIC CORE CIRCUITS

André Michel Richard, Paris, and Jean Brodin, Bourg-la-Reine, France, assignors to Societe d'Electronique et d'Automatisme, Courbevoie, France Filed Sept. 12, 1958, Ser. No. 760,716
Claims priority, application France Oct. 12, 1957
41 Claims. (Cl. 340—174)

The present invention relates to improved saturable magnetic core circuits for binary data processing and handling systems using temporary storage of information bits on such cores having substantially rectangular hysteresis characteristic.

The main component in such systems is the shift register comprising a cascaded series of magnetic core stages with interconnecting transfer circuits or networks for effecting the progression through the shift register of the successive information bits under a definite timing control. Various embodiments of shift registers and logical networks for effecting combinations of information bits according to such logical operations as union, intersection, inhibition, complementation and the like have been designed, the transfer method of which may be summarized as follows: each core may receive through a read-in winding an electrical current representing a definite digital value of information bit which drives the core to a predetermined magnetization condition, for instance a positive remanent induction condition; this occurs during a read-in phase or period; thereafter, during a read-out phase or period, the core is submitted to a magnetomotive force of a direction which drives it to another magnetization condition, for instance a negative remanent induction condition; the core is provided with a read-out winding across which a difference of potential is developed each time a change of magnetization occurs within the core; such a difference of potential may be picked off as an output signal representing and regenerating the digital value which has been temporarily stored on the core. Of course, when, in a read-in period the core has not changed its magnetization condition, it does not change in magnetization condition during the said following read-out period. When no intermediate storage members are provided between two successive core stages, in such systems, each information bit necessitates two successive stages as a single core cannot be read-in and read-out at the same period. The system is of the "two-core per bit" kind.

Certain embodiments of such systems make use of one pair of magnetic cores per stage, each core having a read-in winding and the twin read-in windings receiving signals representing respectively the plain or normal representation of an information bit and the complementary or negative representation of the same information bit; let us call them X and $\overline{X}$ for instance. The advantage of such a provision is that, whether or not the digital value is 0 or 1, there is always an existing current applied to one of the windings of a stage so that, in such systems as above referred to, the two cores of a stage always are in reverse magnetization conditions, most often the positive and negative remanent induction conditions of magnetization.

The present invention has for its object to improve such magnetic core circuits and systems for increasing the efficiency and security or certainty of operation thereof with a view mainly to obtaining an operation which is substantially free from stray effects and to maintain substantially constant voltage and consumption of current regardless of the forms of the digital codes handled in such systems.

Briefly summarized, the invention may be roughly stated as follows: each magnetic core stage comprises at least one pair of magnetic cores or magnetic flux circuits, of a material having a substantially rectangular hysteresis loop; the said cores or magnetic flux circuits (closing through a common yoke piece) are energized simultaneously through a winding thereof by a current of such an alternating character that their magnetic conditions, from this sole control, would vary from a predetermined saturated condition to a non-saturated condition and back to the said predetermined saturation condition, according to a cyclical change of magnetic flux through these cores or flux circuits; preferably the arrangement is such that the range of magnetic flux change is the same for both cores or flux circuits, so that identical changes of voltages appear at output or read-out windings on the said cores or flux circuits. Such an arrangement may easily be extended to a plurality of magnetic cores or flux circuits higher than a single pair thereof.

One at least of the said magnetic cores or flux circuits is provided with a read-in winding which receives a signal representative of a digital information bit and which, for a determined binary value of the bit, blocks the cyclical change of magnetic condition for its core or flux circuit and maintains the magnetic condition at the said predetermined saturated condition; when such signal is present, the effect of the alternating supply voltage is completely applied to the other magnetic core (or cores) or flux circuit (or circuits) of the stage so that the change of magnetic condition therein is correspondingly increased; the corresponding change in the read-out voltages of these latter cores or flux circuits obviously represents the change of digital value in the read-in input of the stage.

Preferably, in a two core (or flux circuit) stage, each core or flux circuit is provided with a read-in winding and these two windings receive simultaneously complementary value signals of the same information bit so that, when the said two cores or flux circuits are also provided each with a read-out winding, the voltage values across the said read-out windings will always be complementary, viz., one voltage is zero and the other one of a definite discrete value.

Preferably also, in a stage comprising more than two magnetic cores or flux circuits, each core or flux circuit is provided with read-in and read-out windings but only a predetermined number of read-in windings may be energized at any period of the alternating current supply for maintaining a corresponding predetermined number of the said plurality of cores or flux circuits in their saturated condition.

The invention will now be fully described with reference to the accompanying drawings, wherein:

FIGS. 1 and 2 respectively show two examples of embodiment of magnetic core stages according to the invention;

FIGS. 3 and 4 show graphs for explaining the operation of the stages of FIGS. 1 and 2;

FIGS. 5 and 6 respectively show two alternative embodiments of a magnetic core stages according to the invention FIG. 7 shows an example of structure of a magnetic core which may be used in the examples of FIGS. 5 and 6;

Figure 11:
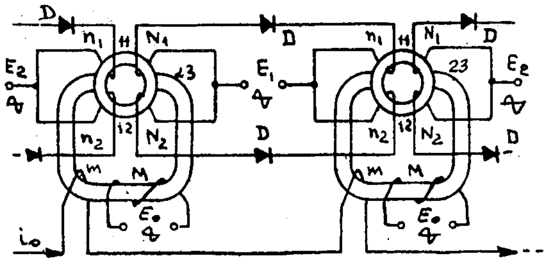
Figure 12:
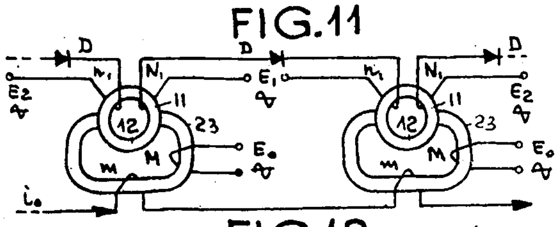
Figure 13:
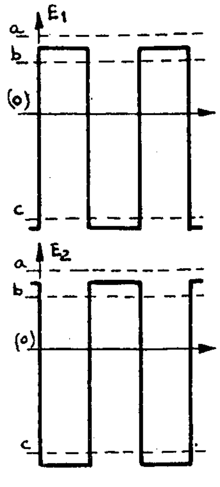
Figure 14:
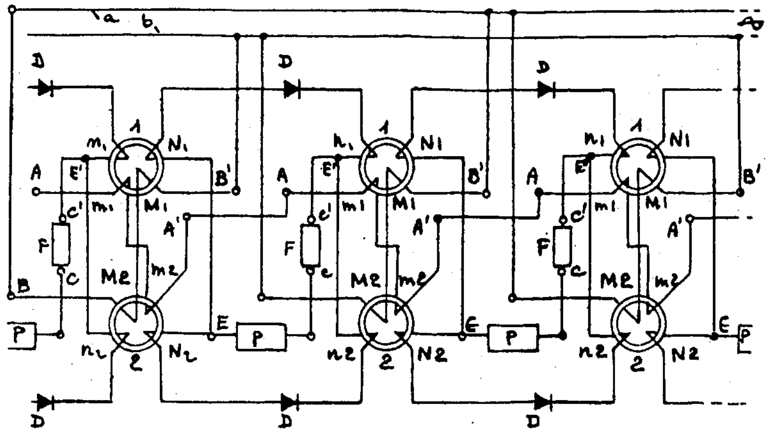
Figure 15:
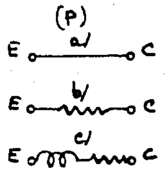
Figure 16:
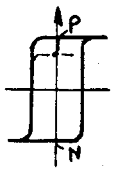
Figure 17:
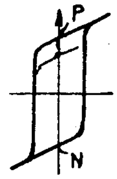
Figure 18:
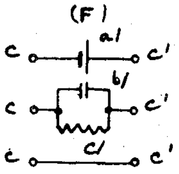
Figure 25:
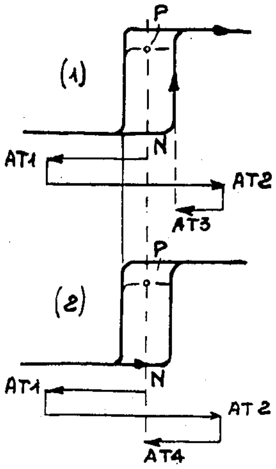
Figure 26:
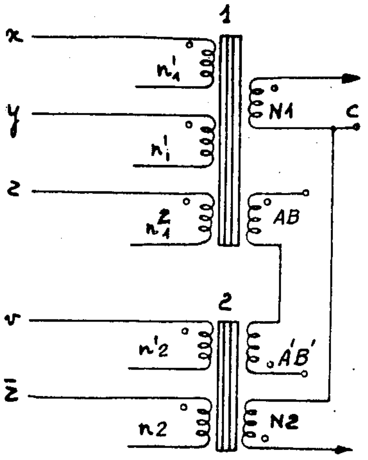
Figure 27:
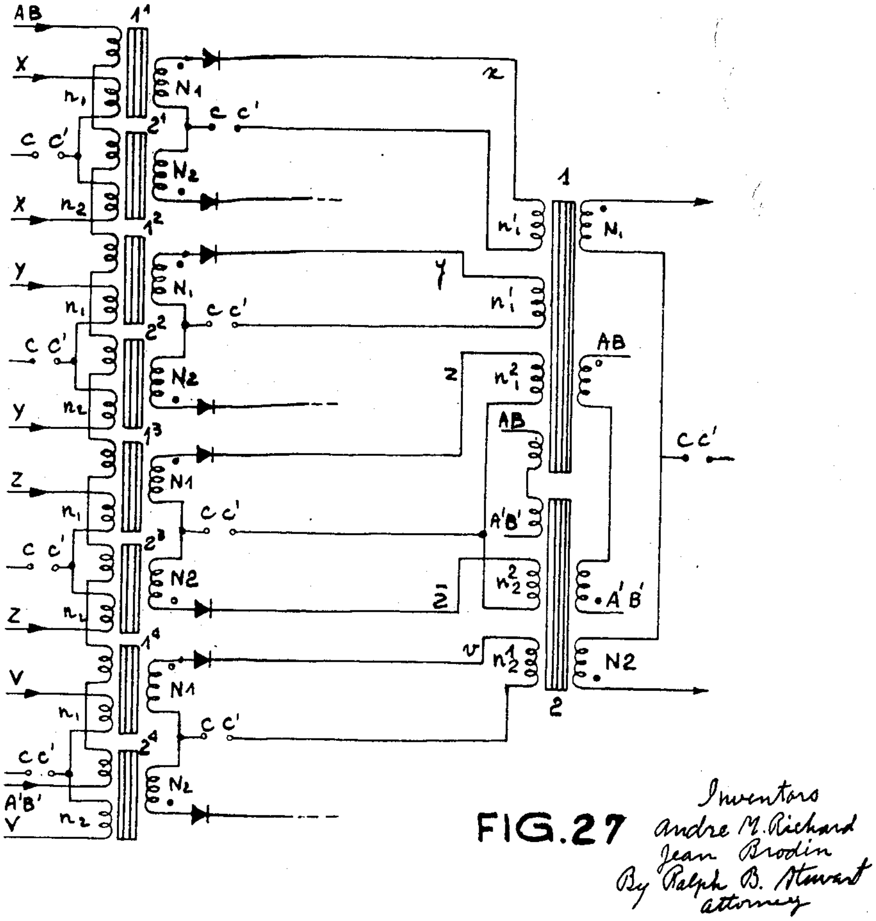
Figure 28:
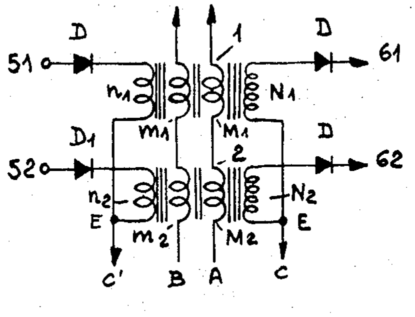
Figure 29:
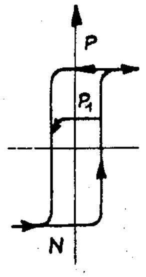
Figure 30:
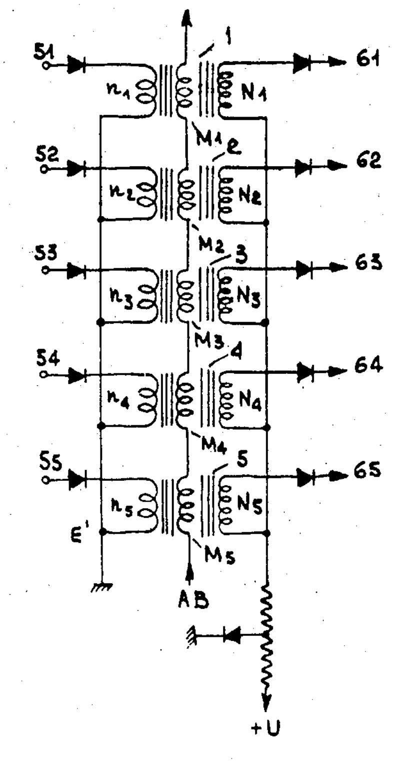
Figure 31:
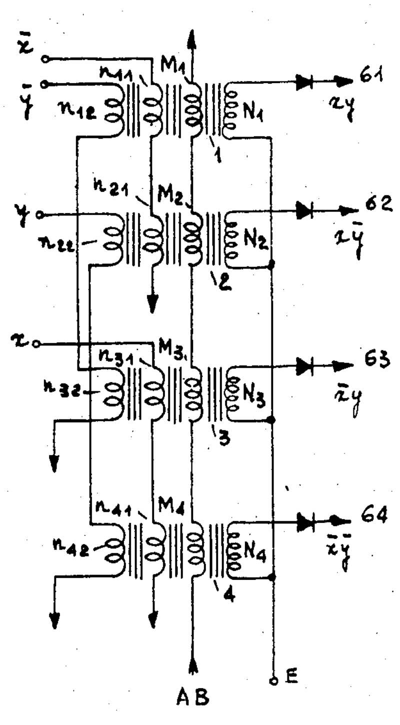

FIGS. 11 and 12 respectively show two further examples of shift registers according to the invention;

FIG. 13 shows voltage waveforms of the auxiliary voltages used in the examples of FIGS. 11 and 12;

FIG. 14 shows another example of a shift register according to the invention;

FIG. 15 shows three possible structures of the member P of the shift register of FIG. 14;

FIGS. 16 and 17 respectively show idealized hysteresis characteristic for explaining the choice amongst the structures of FIG. 15;

FIG. 18 shows three possible structures of the member F of the shift register of FIG. 14;

FIGS. 19, 20, 21 and 22 respectively show further alternative examples of shift registers according to the invention;

FIG. 23 shows a graph for explaining certain features of operation of the said examples of FIGS. 19 to 22;

FIG. 24 shows how certain minor drawbacks of this operation might be avoided;

FIG. 25 shows a graph explaining the manner in which a change of magnetic condition occurs in a core or flux circuit of a stage according to the invention, with a view of effecting logical operations with this stage;

FIG. 26 shows an example of a "logical" stage according to the invention;

FIG. 27 shows an example of control circuits for such a logical stage, including this stage proper;

FIG. 28 shows a further shape of representation of a magnetic core stage according to the invention;

FIG. 29 shows a substantially rectangular hysteresis characteristic for considering certain points of operation of the stage of FIG. 28;

FIGS. 30 and 31 respectively show two further examples of stages according to the invention and comprising more than two magnetic cores or flux circuits in their structure.

Figure 1:
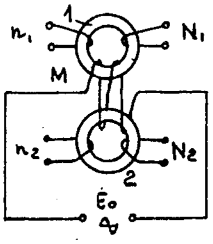
Figure 3:
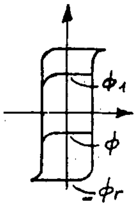
Figure 4:
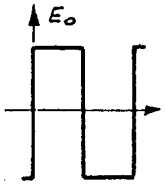

Referring to FIG. 1, a magnetic core stage according to the invention may be made with two distinct toroidal cores of a material having a substantially rectangular hysteresis characteristic such as shown in FIG. 3. These cores are coupled by means of a winding M wound on both of them as a single winding supplied by an alternating electrical voltage from a source $E_0$. The alternating waveform is for instance such as shown in FIG. 4. The core 1 is provided with a read-in winding $n_1$ and a read-out winding $N_1$; the core 2, with a read-in winding $n_2$ and a read-out winding $N_2$. The windings $n_1$ and $n_2$, on the one part, the windings $N_1$ and $N_2$ on the other part, have same numbers of turns or, at least, the ratio of turns $n_1/N_1$ and $n_2/N_2$ is the same if the cores are not identical.

Figure 2:
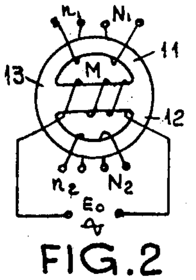

Instead of two separate cores, a single three-legged core may be used as shown in FIG. 2 wherein a central branch 15 has a cross-section of at least twice the dimension of the cross-section of either one of branches 11 and 12. The material of all three branches is the same hysteretic form as in FIG. 1.

Figure 8:
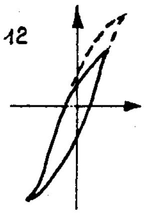
FIG. 8 shows a graph explaining the operation of part of the stages of FIGS. 5 and 6.

As an alternative thereof, the branch which is common to both the magnetic flux circuits may be made of a "soft" magnetic material having a characteristics such as shown in FIG. 8.

Figure 5:
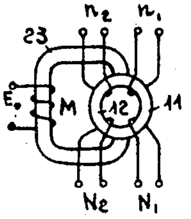
Figure 6:
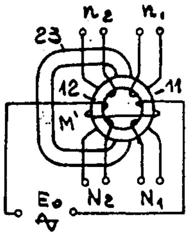
Figure 7:
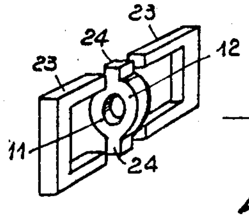

In the embodiments of FIGS. 5 and 6, for instance, the composite material core includes a toroid 11–12 and a soft magnetic material yoke 23. The winding M may be wound either around the said yoke 23, FIG. 5, or distributed as a pair of series half-windings on the parts 11 and 12 of the hysteretic material core as shown in FIG. 6. For instance, the magnetic circuit may be designed as shown in FIG. 7, toroidal core 11–12 being provided with diametrally opposite stubs 24 for the "glueing" thereon of two U-shaped members of soft magnetic material 23 together constituting the branch of same reference of FIGS. 5 and 6.

Whether or not two separate cores or two magnetically coupled flux circuits are used, in a magnetic core stage according to the invention, the voltage $E_0$ effects a cyclical variation of the flux which, when no read-in current exists, drives the two flux circuits of the stage from a definite condition of remanent induction $-\phi_r$ (for instance) to a non-saturated condition $\phi$, in one alternation of the supply and back from $\phi$ to $-\phi_r$ in the other alternation of the supply. Such a cyclical variation of magnetic flux will be of the same directions when a signal representative of a certain valve of an information bit exists on one of the read-in windings during the first above-mentioned alternation of $E_0$ but of course, instead of being of an amplitude $\Delta\phi/2$ for each core, it will have an amplitude $\Delta\phi$ for the core which is not controlled to remain at the saturated condition thereof by the said read-in signal. The waveform of $E_0$ may be rectangular as shown in FIG. 4, but may also be of a sine or trapezoidal or saw-toothed form when desired. It results in the appearance of substantially equal voltages across the output or read-out windings in the first case whereas, in the second case, substantially no voltage will be induced across the read-out winding of the saturated core whereas a voltage substantially of twice the first value will be induced across the read-out winding of the core to which is applied the double amplitude change of magnetic flux.

When each information bit signal is available both in the normal and complementary waveforms and when both these signals are respectively applied to the two read-in windings of a stage, one of the cores or flux circuits will always remain saturated and the other one subjected to the higher change of flux so that one of the read-out windings will always remain with no substantial voltage across it and the other one, present a maximum voltage across it: for example, no active digital signal in $n_1$ and an active signal in $n_2$, carries an output voltage across $N_1$, but no voltage across $N_2$; also no active signal in $n_2$ and an active signal in $n_1$, causes output voltage across $N_2$ and not output voltage across $N_1$.

When the magnetic material is all of a substantially rectangular hysteresis characteristic, the voltage $E_0$ does not need to present a D.C. component, in first approximation at least; but when part of the magnetic circuits is of soft material, the voltage $E_0$ must present such a D.C. component. It will be explained later on how to apply or create such a D.C. component and why in most cases, such a D.C. additional control must be desirable.

Referring to FIG. 3, two magnetic core stages according to the invention are shown with interconnecting looped circuits each including a unidirectionally conducting element such as a diode D, of identical direction of connection throughout, and each including a read-out winding from an emitter stage and a read-in winding to a receiver stage. The shift register is made of such a cascade of magnetic core stages with the phase of $E_0$ regularly reversed from interconnecting to one interconnecting circuit to the next interconnecting circuit. The diodes are not conducting for the currents from the read-out voltages at each upwards change of magnetic fluxes within the emitter stage and are conducting at each downwards change of the said magnetic flux. The operation of such a shift register may be explained as follows:

When for instance the digital value of suitable use exists on the read-in winding $n_1$, the circuit 11 is blocked to the saturated condition but the magnetic circuit 12 is free to come to the $\phi_1$ magnetic condition. During the following read-out period the circuit 11 remains at $-\phi_r$ so that no voltage appears across $N_1$ and consequently the read-in winding $n_1$ of the following stage, for which it is the read-in period, is not controlled for blocking the change of magnetic flux within the circuit 11 of the said following stage, which comes to $\phi_1$. On the other hand, a voltage appears across $N_2$ of the first stage and blocks, through $n_2$, the circuit 12 of the next stage.

Such conditions are reversed when the digital value of the information bit is such that a blocking current is applied to $n_2$ of the first stage, and as the circuit 11 of this stage follows the change of magnetic condition from $-\phi_r$ to $\phi_1$ and back during the read-out period; consequently in the next stage, it is the circuit 11 which is blocked and the circuit 12 which remain free to vary the magnetic condition thereof.

It is obvious that, with such a structure of shift register, the correspondence between the digital values 1 and 0 and the actual signals is reversed from stage to stage, in other words, each stage acts as a complementing operator for binary information bits.

Figure 9:
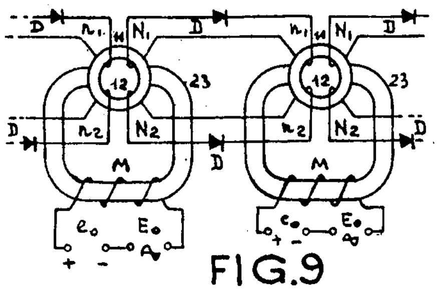
FIG. 9 shows a first example of embodiment of a shift register according to the invention.

In such a schema as shown in FIG. 9, it is obvious that the energy supplied to the "load" by one stage during the read-out period is extracted from $E_0$, this being without any counterpart in the preceding read-in period, and due to the asymmetry of the change of magnetic flux with respect to zero. Such energy may be provided from an auxiliary constant magnetomotive force for instance, as in FIG. 9, by means of a battery $e_0$ serially connected with $E_0$ across the winding M of each stage. This battery simultaneously determines the saturation condition of each core or flux circuit in each stage. In another embodiment, FIGS. 11 and 12, such a magnetomotive force may be provided by a direct current circulating through special windings $m$ of the stages. Of course, the arrangement of FIG. 9 may be used in FIGS. 11 and 12 and conversely, as concerns this auxiliary electromotive force.

When the complementary feature of a shift register such as the one of FIG. 9 is not wanted, one may provide auxiliary electromotive forces within the interconnection networks. For instance, FIG. 11 shows an example of such an arrangement which is derived from the arrangement of FIG. 9. The auxiliary voltages sources $E_1$ and $E_2$ are of respectively opposite phases from interconnecting network to interconnecting network and specially adapted shapes for such voltages are shown in FIG. 13.

During a transfer of information bit from the first stage to the second, the auxiliary source $E_1$ acts in such a direction as to produce in both loops of the interconnection network a current which would suffice for blocking all change of magnetic flux in the second stage. However, the electromotive force in one of the read-out windings of the first stage at the read-out period thereof opposes the action of $E_1$ in the corresponding transfer loop, and no current circulates in the said loop. In the other loop, on the other hand, no limitation is impressed on the current from $E_1$ since the winding N in the said loop is of low impedance as the core thereof is saturated. This current consequently passes through the corresponding core read -in winding of the second stage and blocks this core, which is the corresponding one to the core of the first stage which has been maintained at the saturated condition in the first stage. When for instance, the signal of the suitable digital value is maintained in the branch 11 of the first stage through $n_1$, it is through the loop including the read-out winding $N_1$ of this branch and the read-in winding $n_1$ of the branch 11 of the second stage that the current from $E_1$ circulates for maintaining this branch 11 in the saturated condition.

The voltages $E_1$ and $E_0$ are of same frequency as $E_0$. Preferably they are of rectangular waveform though pure sine waveform may be used therefor. In any case, they must satisfy certain amplitude conditions for ensuring a safe operation of the arrangement. Such conditions may be stated as follows:

When no actual information signal exists in $n_1$, the voltage of $E_1$ must oppose in both interconnection loops, the electromotive force due to the flux change $\Delta\phi$ through $N_1$; and without any current through $n_2$, the same condition occurs, as the voltage which $E_1$ must oppose, being then the voltage across $N_2$. During such read-in phase, the voltage $E_1$ must be of a negative value higher than the value $-N.E_0/M$ (the voltage is considered positive in the direction determined by the diodes D).

During a read-out period for transferring an information bit from one stage to the following one, the voltage $E_1$ (or $E_2$ as the case may be) must effect the blocking of one of the branches of the magnetic circuit of the receiver stage, and for this it must be higher than the positive value $R.i_c/n, i_c$ denoting the coercive current and R the resistance value of the complete series loop (windings, diode in the conducting direction, and, if provided, though not essential per se, a further series resistance for accommodating the current value through the loop concerned). During the same read-out period, the voltage value of $E_1$ must not exceed and oppose the value of the difference of electromotive forces in the windings N of the emitter stage and $n$ of the receiver stage. These forces are of opposite directions of action. The value of $E_1$ consequently must be lower than $(N-n).E_0/M$. These two latter conditions may be compatible from a suitable designing of the stages. In FIG. 13, such conditions have been indicated by the levels $a$, $b$ and $c$ on the graphs of $E_1$ and $E_2$, $c$ being the level of negative amplitude as herein above defined.

Figure 10:
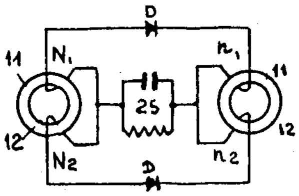
FIG. 10 shows a partial alternative of the shift register of FIG. 9.

Referring back to FIG. 9, at each variation of magnetic flux from $-\phi_r$ to $\phi_1$ in a core or branch, the read-in windings thereof have a voltage induced in a direction which is the same as the direction of conduction of the diodes to which these windings are connected. The resulting current in the loops of the said windings may oppose the variation of magnetic flux from $\phi_1$ to $-\phi_r$ in the core concerned in the preceding stage. Such a drawback may be overcome by provision of a suitable D.C. bias of the diodes. Generally speaking, a counter-voltage must be provided and this may be ensured either by a suitably poled battery in the common lead of the loops or, more advantageously, by means of an impedance serially inserted into the said lead (it may be common to several leads of several interconnection networks). Such an impedance is shown in FIG. 10 as comprising a network including a resistance and a shunt capacitor thereto. Such arrangement will be further detailed and discussed later on, as it will hereinafter appear in relation with FIG. 14.

Prior to such a discussion, the arrangement of FIG. 12 may be considered as an example of a shift register wherein the magnetic core stages are asymmetrically linked as for instance the windings $n_2$ and $N_2$ are omitted in all stages. In the example of FIG. 12 however, the auxiliary sources $E_1$ and $E_2$ are preserved. The direction of connection of any diode is such that it avoids the flowing of any current from a read-out winding of an emitter stage during any read-in period of this stage. The operation may be stated as follows:

When no signal exists on the first stage during a read-in period thereof, the magnetic flux branches 11 and 12 are each driven through a positive flux change of value $\Delta\phi/2$. The voltage appearing across $N_1$ is opposed by the electromotive force $E_1$ acting in the non-conducting direction of the diode D. The following read-out period sees the opposition of the electromotive force across $N_1$ to the action of $E_1$, so that this latter which now acts in the conducting direction of the diode is not effective and the diode remains blocked. No digital value signal is applied to the second stage of the register.

When on the other hand, a signal exists on the first stage during a read-in period, the branch 11 remains at $-\phi_r$. The branch 12 is subjected to a change of magnetic condition from $-\phi_r$ to $\phi_1$. During the read-out period, no electromotive force is present across $N_1$ and the voltage of $E_1$ then generates a current which is effective for maintaining the branch 11 of the second stage at $-\phi_r$. And so forth.

When the auxiliary sources $E_1$ and $E_2$ are omitted in such a single-loop arrangement, it is necessary to preserve $n_1$ and $N_1$ in one stage upon two and $n_2$ and $N_2$ in the other stage upon two so that the normal shifting may be ensured throughout the register. The operation of such a register is obvious now the operations of the registers of FIGS. 9 and 12 have been explained.

Referring now to the arrangement of FIG. 14, there is shown a shift register of the kind of FIG. 9. From this FIG. 14, each stage will be considered as comprising a pair of separate magnetic cores though the arrangements to be described may also and as well as used with single three branched cores when required. The winding M will be considered as comprising two identical parts $M_1$ and $M_2$ separately wound on the said separate cores, as it was the case in FIG. 6. The winding $m$ is also divided into two identical parts $m_1$ and $m_2$ in the arrangement of FIG. 14. The terminals of the alternating character supply windings are referred to as B and B' and the terminals of the direct current supply windings, as A and A'. Each core is thus provided with four windings, $n$, N, $m$ and M of same index of reference as the figure denoting the said core.

One end of each winding $N_1$ is connected to one end of each winding $n_1$ of the next following stage through a diode D, and similarly one end of each winding $N_2$ is connected to one end of each winding $n_2$ of the next following stage through an identical diode D. The other ends of the windings $N_1$ and $N_2$ are connected to a common terminal E, the other ends of the windings $n_1$ and $n_2$, to a common terminal E', in each interconnecting network of the register. Between the terminals E and E' are shown a circuit element P and serially connected therewith a circuit element F (between terminals C and C').

FIG. 16 shows the idealized hysteresis cycle of each core of FIG. 14 and FIG. 17 shows an also idealized hysteresis characteristic though of a closer shape to reality.

In FIG. 14 for instance, the signal representing the digital value 0 is such that it maintains the core 2 at the saturation condition N, FIGS. 16 and 17, and conversely a signal representing the digital value 1 maintains the core 1 at the said saturated condition. This saturated condition N is determined by the direction of the D.C. bias through $m$. The unblocked core will be controlled to reach a magnetization point P of opposite sign with respect to the condition N. P may be the opposite saturation point but this is not essential. The value of the A.C. supply is such that, if no read-in currents were present, each core would be driven into a cyclical change of flux not exceeding one-half of the change existing in the unblocked cores. The part played by the D.C. supply, in addition to defining the "rest" condition of the cores, is to supply to each stage the current from the load at each change of one core of the stage back to its rest condition, as it has been previously stated.

Considering now the circuit elements P and F of FIG. 14 it may be stated that, for each transfer of a digital value from one stage to the next following one, one of the loops of the concerned interconnecting network must carry an electrical current and the other loop must not carry such a current. When for instance a transfer of digital value 0 occurs between the stage (I) and the stage (II), the loop $N_1$–D–$n_1$ and return lead receives a current for maintaining the core 1 of stage (II) in the N magnetic condition but, in the stage (II), the core 2 changes from N to P condition and a stray voltage is then produced into the loop $n_2$–D–$N_2$ and return lead. It is desirable to cancel such a stray voltage by means of an appropriate counter-voltage. In another point of view, the current produced by the change of condition of the core 2 of the second stage from N to P has such a direction that it opposes the said change of condition. It is also desirable to cancel this stray current by introducing a counter-current of appropriate value. Elements P and F are respectively proposed for correcting this voltage and this current of deleterious actions.

In a first approximation, the hysteresis loop being considered as shown in FIG. 16, the circuit element P may be a mere resistance, graph $b$ of FIG. 15, and in a second approximation, the hysteresis loop being such as shown in FIG. 17, the said circuit element P may be a series network of a resistor and an inductance coil, graph $c$ of FIG. 15. When the hysteresis loop may be considered as substantially rectangular, FIG. 16, the electromotive forces in the windings of an emitter and a receiver cores changing their respective conditions have values related to the ratio of the numbers of turns of the said windings, $n/N$, $n$ denoting any number of turns of $n_1$ or $n_2$ and N, any number of turns of $N_1$ or $N_2$. For compensating the electromotive force in the winding $n$ of the receiver stage in its stray action on the magnetic core which is of a changing magnetization condition, it suffices that a part of at least $n/N$ of the voltage U across the winding of the emitter stage from which issues the current towards the receiver stage and to feed this part of the said voltage as a compensating one. In such a case, the value $r$ of the resistance constituting the circuit element P will be provided such that, with respect to the overall resistance R of the interconnecting network, the relation $$(1) \qquad \frac{r}{r+R} \geq \frac{n}{N}$$

be satisfied, that is $$(2) \qquad r \geq R.\frac{n}{N-n}$$

When the hysteresis loop of the cores must be considered as being such as shown in FIG. 17, there exists an additional inductive component as well on the read-out winding of the saturated core of the emitter stage as on the read-out core of the stage. For a value $i$ of the current, and for an elementary inductance $l$ of one turn of these windings, this inductive component is $N^2.l.di/dt$. For the compensation of this component an inductance coil of value L is serially connected to the above resistance of value $r$. The value L may have the following relation to the other components of the stages:

$$(3) \qquad L.di/dt = (L+N^2.l.)\cdot\frac{n}{N}\cdot di/dt + N^2.l.di/dt$$

viz., $$(4) \qquad L = \frac{N+n}{N-n}\cdot N^2.l$$

The Relation 3 is justified by the fact that the additional voltage component across the winding of the emitter stage from which issues the current of value $i$ is $$(L+N^2.l).di/dt$$

and it is the $n/N$ part of this component which must be compensated for simultaneously as the component across the other winding N, by the voltage generated across the inductance coil L.

Mainly when such a resistance-inductance network is provided as P, the compensation of current may be estimated sufficient for dispensing with any actual member F and this circuit element F may then be provided as a mere connecting lead across terminals C and C', as shown at $c$ on FIG. 18.

When provided, the circuit element F may consist of a battery, FIG. 18$a$ though a more advantageous structure of F may consist of a self-biassing network, FIG. 18$b$. When F consists of a battery in an interconnecting network, P may be a mere connecting lead, such as shown in FIG. 15$a$. Preferably however a discrete circuit element P of the kind of FIG. 15$c$ will be maintained, even when not shown in further figures and even when the circuit element F is provided as a single element for a plurality of stages. In the following figures the manner of providing such an element F common to several stages will be described and the terminals C and C' thereof will be considered in this respect as interrupting the corresponding lead for such insertion.

Figure 19:
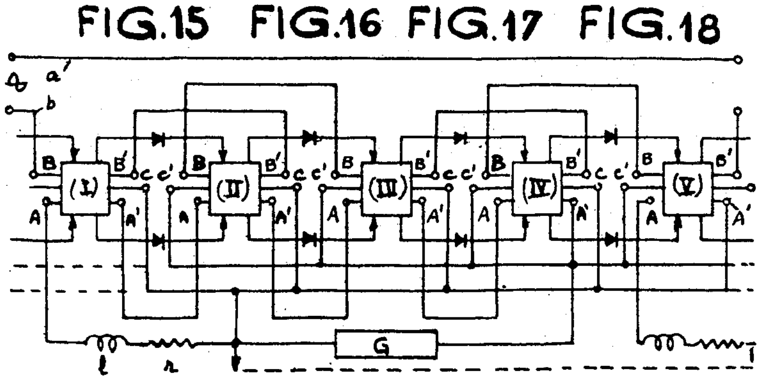

Across the terminals C and C' a direct current component must be provided and consequently it is further provided, according to a feature of the invention, to insert the said terminals in the direct current supplies of such windings as $m_1$ and $m_2$ of the stages. When for instance in FIG. 19, the D.C. windings, across terminals A and A′, of a plurality of stages are supplied from a common D.C. source G, the character of which will be herein further explained, in a preferred form thereof, the terminals C and C′ of the said stages are shunt connected across the wires of a pair from the poles of G. The number of stages for such a connection is preferably such that it includes as many stages supplied from one phase of the A.C. supply as stages supplied from the other phase of the said supply. The example of FIG. 19 shows groups of four stages fed from the D.C. source G through a series network including a resistance $r$ and an inductance $l$. The resistance $r$ is only provided when the voltage across G is greater than necessary, in the other case it may be omitted. The inductance $l$ is or may be provided only when a dissymmetry exists or is felt to exist between the two phases of the alternating character supply. The part played in such a case by the said inductance is to damp the sudden stray fluctuations of current which may be produced in the system. In other cases, the inductance may be omitted. In the example of FIG. 19 it has been shown that a single D.C. source G may supply several groups of magnetic core stages, by parallel connection across this source of several series circuits of D.C. windings of such stages.

The nature of the D.C. generator G must be considered from two points of view. The first point of view is obvious, that of ensuring an energy consumptive supply and a D.C. bias in the system of interconnecting networks. If this first point of view prevails the source G is constituted by a battery. The second point of view, if it prevails, implies the constitution of G as a self-biassing energy recuperating network of the kind of FIG. 18*b*. In the transfer system, there exists a mean D.C. component of current since the consumptions of energy from the alternating source are not symmetrical along the shift register and during the progression of a binary code therethrough, as they depend upon the configuration of the said code (number and distribution of 1's and 0's in the code). The energy of the said mean D.C. component may be used as a supply of biassing current for the magnetic core stages. The value of such a D.C. component increases with the number of magnetic core stages which are multipled from the point of view of the D.C. bias. It may be enhanced by increasing such a number of stages in each above-defined group of stages. The provision of a self-biassing network of the kind which has been specified above consequently enables the recuperation of the energy of such a mean D.C. component current and the use of it for substitution to the battery current. Of course, in such a case, the energy taken by the windings across terminals A–A′ must be lower than the energy available across terminals C–C′ or at least equal to the said available energy, in each stage and associated interconnecting network of the system. Such a condition may always be satisfied by appropriately choosing a high cross-section for the conductors or the D.C. windings of the stages and, of course, a suitable capacity of the self-biassing network substituted for the battery as the D.C. generator G. The shunt resistance of such a self-biassing network may be so adjusted as to provide a suitable overall current from terminals C and C′ in view of the direct current consumption of the windings of the stages concerned.

Figure 20:
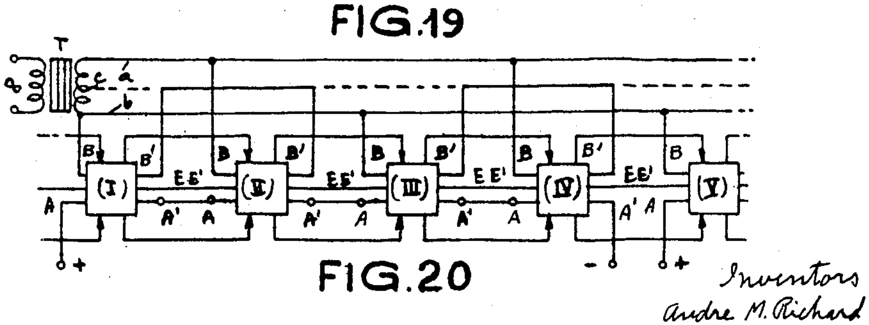

FIG. 19 further shows an alternative arrangement of the A.C. supply with respect to FIG. 14. In FIG. 14, each stage is connected across the two wires $a$ and $b$ of the A.C. supply; In FIG. 19, the stages are serially connected by their A.C. windings in the wire $b$ of this supply, the return conductor of which is shown at $a$. Of course this series connection is effected with a systematic reversal from stage to stage, the terminal B′ of stage (I) being connected to the terminal B′ of stage (II), the terminal B of stage (II) being connected to the terminal B of stage (III) and so forth. In order that both alternations of the A.C. supply remain of same amplitude, it is necessary that an even number of stages must be so serially connected. For obtaining such a distribution, one may, as shown in FIG. 20, group the stages by pairs or at least by limited number of pairs. The electrical arrangement then becomes of the series-parallel kind. When a mid-point transformer is available one may further connect the A.C. windings of the stages alternately across the wires or leads $b$ and $c$, and $a$ and $c$, of the supply.

According to a further feature of the invention, it is proposed to use a single winding for the A.C. and D.C. control of the stages. FIGS. 21 and 22 respectively show two examples of such an arrangement, the terminals of these windings are referred to as AB and A′B′.

In FIG. 21, one of the wires of the A.C. supply, $b$ for instance, is duplicated into two wires $b^1$ and $b^2$, across which is connected the D.C. source G. The terminals C and C′ of the interconnecting stage networks are connected across the terminals of G. Considering that to this D.C. generator is connected to a series resistance $r$ (the series inductance is needless in the arrangement), an auxiliary wire $d$ is provided for the connection of terminals C for instance. Of course, when such a resistance $r$ is omitted, the wire $d$ will be the wire $b^2$. The D.C. generator G may consist of a battery or of a self-biasing network, as said. In the latter case, when the current is excessive, a shunt resistance $r'$ will be connected across the wires $b^1$ and $b^2$; if not, such a shunt resistance will be omitted.

The supply windings of the stages (I), (III), . . . are connected across the wires $b^1$ and $a$, and the supply windings of the stages (II), (IV), . . . are connected across the wires $b^2$ and $a$.

In FIG. 22, the A.C. supply is applied through a transformer having a mid-point $e$ from which is drawn a wire $c$ in which is serially connected the D.C. generator G followed by a series network of resistance and inductance of same character as in FIG. 19, the wire $e$ being used for a return lead through G for the combined D.C./A.C. controls of the magnetic core stages, grouped over the wires $a$ and $b$ and this wire $e$. The terminals C and C′ of the interconnecting networks are connected across the center-tap wire $c$ and another wire $d$ from the other pole of the D.C. source G, ahead of the said series resistance-inductance network.

When the compensation of distribution of the magnetic core stages between the two phases of the A.C. supply is satisfied, the operation of the system may be considered as approximately correct and the transfer waveform for one core is shown in the graph of FIG. 23. The A.C. current is of symmetrical shape with respect to a level "Pol." of the D.C. bias, the alternation $S_r$ is the alternation controlling the core concerned and the alternation $S_a$ is the alternation which, in the cross-hatched line part thereof, defines the transfer signal to the next core of the following stage. Such an operation is not ideal as it would be desirable that the A.C. supply presents narrow alternations for the control and wide alternations for the transfer. The transfer signal issues from a core which is brought back to its saturated condition and the control signal is applied to a receiver core by the alternation of opposite sign of the supply.

The shaping of alternations of an alternating current may be made, as known, by introducing a current of the second harmonic frequency with respect to the frequency of the said alternating current proper. Precisely, in such a circuit arrangement as the one of FIG. 22, the wire $c$ carries a current containing such a second harmonic frequency and this may be of advantage as follows: see FIG. 24*a*, a circuit arrangement inserting an impedance H between points $h$ and $h'$ in the said wire $c$. This impedance may be so provided as to enhance the said second harmonic frequency. When the voltage across H is positive, it speeds up the read-in and slows down the read-out. But of course such actions must occur in timed relation with the read-in and read-out signals of the stages. If H were a mere resistance the positive maxima of the voltage will exist after the ends of the useful signals, this being due to the effect of the diodes in the read-out networks and also (and probably chiefly) to the effect of the saturation of the magnetic cores near the end of read-out periods. For giving a phase lead to such a voltage, in order to avoid such effects, impedance H may consist, as shown in FIG. 24*b*, of an inductance coil and across it, but not essential, a shunt condenser. However in actual practice it has been found of advantage to shunt the said inductance coil by a series circuit including a resistance and a condenser, tuned to the fundamental frequency of the A.C. supply so that it presents a zero impedance value for the said fundamental frequency, as shown in FIG. 24*c*. This arrangement avoids an undue limitation of value of read-out currents, a stray effect produced with such an arrangement as in FIG. 24*b*. With such a supply circuit arrangement it has been possible to operate a system comprising unevenly distributed magnetic core stages in the two phases of the A.C. supply.

The execution of logical operations with stages according to the invention may be provided with at least two windings for separate read-in signals on the magnetic cores of a stage, so that the union of at least two distinct binary bit signals may be effected on this stage. It is obvious that, since any variable information bit is available in both normal and complementary forms at any stage according to the invention, each logical operation between separate binary signals may be obtained from suitable combinations in union of appropriately chosen forms of the said signals. However, the operation of a "logical" stage is not imperatively symmetrical and, as two cores are associated and commonly controlled, it is essential that the other core receives at least one of the signals involved in the union on the first core, but in the complementary form with respect to the form it is involved in such a union operation.

FIG. 26 shows an example of logical stage according to the invention. The magnetic core 1 is provided with three windings, two of them have a number of turns $n_1^1$ and the third, a number of turns $n_1^2$. The magnetic core 2 is provided with two windings, one of them has a number of turns $n_2^1$ equal to the number of turns $n_1^1$, the other, a number of turns $n_2^2$ equal to $n_1^2$. The windings $n_1^2$ and $n_2^2$ receive complementary forms of a same signal as being connected to the read-out outputs of a stage handling the variable Z, see for instance FIG. 27. The winding $n_1^2$ receives the waveform $z$ of the said signal and the winding $n_2^2$, the waveform $\bar{z}$. The Z stage in stage in FIG. 27 includes the magnetic cores $\mathbf{1}^3$ and $\mathbf{2}^3$. The windings $n_1^1$ respectively receive the waveforms $x$ and $y$ from stages handling the variables X and Y, pairs of magnetic cores $\mathbf{1}^1$–$\mathbf{2}^1$ and $\mathbf{1}^2$–$\mathbf{2}^2$ of FIG. 27. The winding $n_2^1$ receives the waveform $v$ from a further stage $\mathbf{1}^4$–$\mathbf{1}^4$ handling the variable V.

The operation of such a logical stage as in FIG. 26 is essentially based upon the difference between the inhibiting ampere-turns on the cores 1 and 2 of the stage. Referring to the graph of FIG. 25, for instance there is shown the case when the core 1 changes the magnetization condition thereof and the core 2 remains unchanged. The reset part of the magnetic flux change in the said cores having left them in a certain saturation condition, determined by the D.C. ampere-turns $AT_1$, the A.C. ampere-turns $AT_2$ for the change of magnetization condition from N to P are the same for both cores but on core 2 they are opposed by the ampere-turns $AT_4$ of the incoming signals whereas on core 1 the ampere-turns $AT_3$ of such incoming signals are not sufficiently high for opposing the change of condition of the said core 1. The control effect is reversed when $AT_3$ are high and $AT_4$ are low.

The ampere-turns applied to the core 1 in FIG. 26 result from the union of the signals $x$, $y$ and $z$. The ampere-turns applied to the core 2 result from the union of the signals $v$ and $\bar{z}$. On each input read-in winding further, several signals from separate prior stages may be applied if required as such signals may be "mixed" through the connecting diodes prior to their application on one input of a logical stage. Such an extension is obvious and does not need to be further shown or explained. For simultaneous application of a signal to several stages according to the invention, it suffices to serially connect the read-in windings concerned in such stages.

For explaining further the operation of the logical stage of FIG. 26, it is assumed that the value 1 of any variable is represented by a high current to the read-in winding concerned of the waveform representing the normal value of the said variable. For $Z=0$, $\bar{z}$ is a high value current and $z$ is a low value current, if any. For $Z=1$, $z$ is the high value current of the pair.

The $x$ and $y$ signals, on the one hand, the $v$ signal on the other hand, cannot simultaneously "exist" in their high value of current. Otherwise stated, these signals are related by the logical relation:

$$(5) \qquad (x+y).(v)=0$$

The + sign denotes the union (one or the other or both signals) and the . sign denotes the intersection (both at the same time). The effects of variable $x$ and $y$, and of the variable $v$ may be separately considered for the logical action of the stage.

Considering first the signals $x$, $y$, $z$ and $\bar{z}$, the signal representing the digital value 1 of either $x$ or $y$ must counterbalance out the high value of current of $\bar{z}$. This is ensured by providing each one of the windings $n_1^1$ of a number of turns multiple of that of the windings $n_1^2$ and $n_2^2$. Obviously, the number of turns of $n_2^1$ for $v$ must be identical to that of $n_1^1$ for balancing out the signal $z$ when required.

When either one or several of the signals $x$, $y$ and $z$ will represent the digital value 1, the core 1 will be blocked and the core 2 will change of magnetic condition in the above-described variation of flux from N to P and return to N. The output from $N_1$ represents the result of the logical operation $(\bar{x}.\bar{y}.\bar{z})$ and the output from $N_2$ represents the result of the logical operation $(x.y.z)$.

The above conditions are reversed for the signals $v$ and $z$ so that in such a case, the output from $N_1$ represents the result of the operation $(\bar{z}+v)$ and the output from $N_2$, of the operation $(z.\bar{v})$.

In certain stages of a system according to the invention, it may be of advantage to control simultaneous operation of more than two magnetic cores or flux circuits, mainly in order to simplify or amplify the logics of the system. According to a further feature of the invention, such stages are provided with a number of magnetic cores or flux circuits higher than 2, let us say with a number $p$ of cores, associated through a simultaneous and common control from the A.C. and D.C. supplies. The inhibition control is preferably effected by $q$ signals, $q$ being lower than $p$ and comprised between 1 and $(p-1)$ as required. The outputs from such a stage may then be activated by $(p-q)$ in such cases.

FIG. 28 shows a circuit representation of a normal two-core stage according to the invention, with as an example, separate A.C. and D.C. supplies. In FIGS. 30 and 31, on the other hand, the said supplies are applied through common windings on the cores.

In the stage of FIG. 28, as stated for the preceding examples of embodiment of the invention, the supplies without any input active signals produce a variation of magnetic condition of both cores from a saturated condition N to an intermediate unsaturated condition $P_1$, FIG. 29, and back from $P_1$ to N. The same value of current is established in $N_1$ and $N_2$. When one of the read-in inputs 51 and 52 is activated, the corresponding core remains at N and the amplitude of the variation of magnetic flux is twice the preceding one in the other core. No output current appears at $N_1$ or $N_2$, and a higher current appears at $N_2$ or $N_1$ as the case may be, output channels 61 and 62.

In a stage including a number *p* of magnetic cores, these cores will be controlled for a same variation of magnetic flux in the absence of any inhibiting signal on their read-in windings. When a definite number *q* of the cores is inhibited, the other $(p-q)$ cores are subject to higher changes of magnetic condition. When a constant number *q* of the cores is inhibited at each and any alternation, only $(p-q)$ outputs will permanently present output currents, and *q* of them will never present an output current. The selection of these *q* cores may vary.

When each one of the said $(p-q)$ outputs is due to carry a constant current independently of the selection of the *q* inhibited cores and independently of the $(p-q)$ thus selected, further provision must be made in the stage. Considering for instance the arrangement of FIG. 30 which includes five cores in the stage, from 1 to 5, provided with identical windings $M_1$ to $M_5$ for the supplies from terminal AB, the read-in windings from $n_1$ to $n_5$ are separately connected to input channels 51 to 55 and have their other ends connected to earth at E'. The read-out windings $N_1$ to $N_5$ are connected to separate output channels 61 to 65 and their other ends are connected to a network applying a battery voltage $+U$ from terminal E. Referring to the five control signals as *a*, *b*, *c*, *d* and *e*, on channels 51, 52, 53, 54 and 55, it may be first considered that four or five of the signals are of digital value 1 in any alternating period of the supply. In such an example only one of the output channels will be activated at each period of the said supply, with $p=5$ and $q=4$. The combination *a, b, c, d* issues a signal on channel 65, the combination *a, b, c, e* issues a signal on channel 64; a.s.o.

As a second example of operation of FIG. 30, it may be considered that three input signal over five are always present so that two output channels will be activated in any period of the A.C. supply. Obviously ten alternatives are possible in such a schema: the combination *c, d, e* ensures the issuance of output currents on 61 and 62; the combination *b, d, e,* on 61 and 63; a.s.o. In this example, $p=5$ and $q=3$.

When the same number of output channels is activated in the arrangement of FIG. 30, the value of current in any one of the activated channels only depends upon the impedance load in the said channel. Such loads may be of different values and further their values may vary with respect to the time as they may consist of logical stages for instance. A substantially constant current in any one of the said output channels may however be maintained by providing a suitable arrangement for the network applying the biasing voltage $+U$ at the terminal E. For instance, in FIG. 30, there is shown a network comprising two series resistances 66 and 67 to the source $+U$ and from the connecting point of the resistances a diode 68 to the earth. The value of resistance 67 is high with respect to that of the resistance 66 and so is the value of $+U$. The direction of connection of diode 68 is such that it is conducting during the read-in periods of the stage, thus ensuring the passage of a definite value of current I through 67 and, during each one of the read-out period, this diode is not conducting as soon as the same value of current is reached so that resistance 67 is switched back into the circuit of the battery voltage $+U$.

Such an arrangement enables the obtention of a constant current value but of course the duration of the current with respect to the time is then controlled from the load condition of the stage. When such an effect is not permissible, it may be compensated for by feeding back part of the current from the diode 68 to additional feedback windings on cores 1 to 5 of suitable number of turns in this respect. The feedbacks act on the speed of variation of the magnetic flux in the cores and consequently at least reduce the said default of time duration of the signals.

In FIG. 30, the read-in control signals have been formed prior to their application on the stage. In FIG. 31, wherein $p=4$, magnetic cores 1 to 4, are each controlled by combinations of two signals X and Y, in their normal *x* and *y*, and their complementary $\overline{x}$ and $\overline{y}$ forms. Core 1 is provided with two windings $n_{11}$ and $n_{12}$ respectively receiving the signals $\overline{x}$ and $\overline{y}$, core 2 with two windings $n_{21}$ and $n_{22}$ respectively receiving the signals $x$ and $\overline{y}$, core 3 with two windings $n_{31}$ and $n_{32}$ respectively receiving the signals $\overline{x}$ and $y$, and core 4 with two windings $n_{41}$ and $n_{42}$ respectively receiving the signals $x$ and $y$. Each core is maintained in a saturated condition when either signals are simultaneously of higher current value. The output channels 61 and 64 are respectively activated for such conditions as $x.y$ for 61, $x.\overline{y}$ for 62, $\overline{x}.y$ for 63 and $\overline{x}.\overline{y}$ for 64. One core only is free to change the magnetic condition thereof at each alternation of the supply.

Other multi-core stage arrangements may obviously be derived from the examples of FIGS. 30 and 31.

What is claimed is:

1. Saturable magnetic core circuits for handling binary data or informations, of the kind wherein a number of magnetic core stages are connected in at least one shift register arrangement by means of interconnecting transfer circuits, wherein each one of the said magnetic core stages comprises at least two magnetic flux circuits of a material having a substantially rectangular hysteresis loop, a winding fed by a supply of alternating current coupled with each of said magnetic flux circuits for driving them into an identical variation of magnetic flux from a predetermined saturated condition to a non-saturated condition and back to the said saturated condition, when acting alone in one cycle thereof, at least one read-in winding on each of the said magnetic flux circuits for the reception of a current of information bit which, for a predetermined digital value thereof in one read-in winding maintains its magnetic flux circuit at substantially the said saturated condition, and means coupling the two magnetic flux circuits of each stage to cause interaction between said magnetic circuits such that saturation of one circuit by an information signal causes the alternating current supply to produce in the other magnetic flux circuit a variation of flux of greater and substantially double amplitude, and at least one read-out winding on one of the said magnetic flux circuits across which appears a voltage which is characteristic of the change of condition of the magnetic flux in the magnetic circuit of the said read-out winding.

2. Saturable magnetic core circuits according to claim 1, wherein each magnetic flux circuit is a separate core.

3. Saturable magnetic core circuits according to claim 1, wherein the said magnetic flux circuits consist of separate branches of a material having a substantially rectangular hysteresis loop interconnected by a third magnetic circuit branch which is of a soft magnetic material.

4. Saturable magnetic core circuits according to claim 1, wherein the said magnetic flux circuits consist of separate branches of a material having a substantially rectangular hysteresis loop interconnected by a third magnetic circuit branch which is also of a material having a substantially rectangular hysteresis loop.

5. Saturable magnetic core circuits according to claim 1, wherein the said winding of alternating current supply is wound over both magnetic flux circuits of the stage.

6. Saturable magnetic core circuits according to claim 1, wherein the said alternating current winding is distributed in two coils of the same number of turns on the said two magnetic flux circuits.

7. Saturable magnetic core circuits according to claim 3, wherein the said alternating current winding is wound over the said soft material branch of the circuits.

8. Saturable magnetic core circuits according to claim 1, wherein a D.C. bias is superimposed on the said alternating current for predetermining the said saturated condition of cyclical reset of the said magnetic flux circuits.

9. Saturable magnetic core circuits according to claim 8, wherein the said D.C. bias is obtained by passing a direct current through the winding receiving the alternating current.

10. Saturable magnetic core circuits according to claim 8, wherein the said D.C. bias is obtained by passing a direct current through an additional winding provided on both the magnetic flux circuits of the stage.

11. Saturable magnetic core circuits according to claim 1, wherein part of the stages are provided with more than two magnetic flux circuits to which the said alternating character supply is commonly applied.

12. Saturable magnetic core circuits according to claim 1, wherein at least one inhibiting read-in winding is provided on any magnetic flux circuit of the stage.

13. Saturable magnetic core circuits according to claim 1, wherein complementary information signals are applied to at least one pair of read-in windings on distinct magnetic flux circuits of the stage.

14. Saturable magnetic core circuits according to claim 13, wherein at least one magnetic flux circuit of a stage is provided with several read-in windings for the application thereto of as many distinct information signals, the number of turns of the said windings which do not have any counterpart winding receiving the corresponding complementary information signal on the other core or cores being higher than the number of turns of such complementary signal windings.

15. Saturable magnetic core circuits according to claim 14, wherein the information signals applied on one of the magnetic flux circuits of a stage on windings not having any complementary counterpart on the other magnetic flux circuit of the stage cannot coincide in time with information signals applied to windings on the said other magnetic flux circuit having no complementary counterpart on the first.

16. Saturable magnetic core circuits according to claim 11, wherein each of the said magnetic flux circuits is provided with at least one read-in winding and the read-in information signals remain of a constant number throughout the operation of the stage.

17. Saturable magnetic core circuits according to claim 16, wherein each one of the said magnetic flux circuits is provided with at least one pair of separate read-in windings, and these read-in windings are controlled by pairs on distinct magnetic flux circuits from complementary information signals.

18. Saturable magnetic core circuits according to claim 1, wherein several information signals are mixed through unidirectional conducting leads to a common input of read-in windings on a magnetic flux circuit of a stage.

19. Saturable magnetic core circuits according to claim 1, wherein the output of any read-out winding of a stage includes a series connected unidirectionally conducting element to at least one input end of a read-in winding of a further stage, the direction of conduction of such an element enabling the current to pass when the corresponding magnetic flux circuit is driven back to the saturated condition thereof.

20. Saturable magnetic core circuits according to claim 19, wherein the phase of the alternating current supply is regularly reversed from stage to stage of the circuits.

21. Saturable magnetic core circuits according to claim 19, wherein each stage only comprises a read-in winding on a magnetic flux circuit thereof and a read-out winding on the other magnetic flux circuit thereof.

22. Saturable magnetic core circuits according to claim 19, wherein each stage comprises a pair of read-in windings and one pair of read-out windings, and the interconnecting networks each comprises a pair of loops each one of which includes a read-out and a read-in winding at least of different stages.

23. Saturable magnetic core circuits according to claim 22, wherein the pair of loops have a common return lead.

24. Saturable magnetic core circuits according to claim 23, wherein this return lead includes a counter-voltage and counter-current source.

25. Saturable magnetic core circuits according to claim 24, wherein the said source is a battery.

26. Saturable magnetic core circuits according to claim 24, wherein the said source is a self-biassing network.

27. Saturable magnetic core circuits according to claim 26, wherein the said network includes a series resistance and a shunt capacitor thereto.

28. Saturable magnetic core circuits according to claim 26, wherein the said network includes a series resistor and a series inductance coil.

29. Saturable magnetic core circuits according to claim 26, wherein the said self-biassing network is reduced to a series resistor.

30. Saturable magnetic core circuits according to claim 24, wherein the said voltage source is a battery and the said current source is a network including a series resistor and a series inductance coil therewith.

31. Saturable magnetic core circuits according to claim 30, wherein the said battery is common to a plurality of stages, of even number distribution between the phases of the alternating character supply.

32. Saturable magnetic core circuits according to claim 31, wherein the said battery is the one which supplies the stages with the said D.C. bias of the supplies.

33. Saturable magnetic core circuits according to claim 32, wherein the said battery is associated to a series inductance-resistance network, the D.C. windings of the stages being serially connected across the terminals of such a supply D.C. unit and the return leads of the loops of the interconnecting stages being interrupted for shunt connection across the terminals of the said battery.

34. Saturable magnetic core circuits according to claim 33, wherein the said alternating character supply is of a kind having a mid-point of neutral voltage available and the said supply D.C. unit being serially connected from this mid-point to a return lead of the alternating character supply, and wherein further the D.C. and A.C. windings of the stages are common for the two kinds of supplies.

35. Saturable magnetic core circuits according to claim 32, wherein the said D.C. supply is made of a battery and a series resistor, connected in shunt across a pair of A.C. leads obtained from doubling one lead to the alternating character supply, the D.C. and A.C. common windings of the stages being serially connected and distributed across the one and the other of said leads and a common A.C. return lead with a regular alternation of the interconnections of the said windings from stage to stage, and the return leads of the interconnecting network loops being opened and shunt connected from such opening terminals to the terminals of the said battery.

36. Saturable magnetic core circuits according to claim 34, wherein the return lead of the alternating character supply is connected to the said mid-point through a network tuned partly at least on the second harmonic frequency of the said supply.

37. Saturable magnetic core circuits according to claim 36, wherein the said network further comprises a series tuned circuit for the frequency of the said supply.

38. Saturable magnetic core circuits according to claim 37, wherein the said network comprises an inductance coil shunted by a series network of resistor and further inductance coil therein.

39. Saturable magnetic core circuits according to claim 23, wherein the said D.C. bias is obtained from recuperation of the mean D.C. component of the currents through the said interconnecting networks from the return leads of the said networks.

40. Saturable magnetic core circuits according to claim 19, wherein the said series circuit includes in the return lead thereof an auxiliary source of alternating supply of a phase regularly reversed from interconnecting to interconnecting networks and in phase opposition with respect to the phases of the alternating character supply in the stages preceding each one of the said interconnecting network.

41. Saturable magnetic core circuits according to claim 40 and wherein the said auxiliary sources are of a rectangular shape of waveform.

References Cited in the file of this patent

UNITED STATES PATENTS

| | | |
|---|---|---|
| 2,680,819 | Booth | June 8, 1954 |
| 2,735,021 | Nilssen | Feb. 14, 1956 |
| 2,803,812 | Rajchman | Aug. 20, 1957 |
| 2,816,278 | Whitely | Dec. 10, 1957 |
| 2,828,477 | Lanning | Mar. 25, 1958 |
| 2,831,150 | Wright | Apr. 15, 1958 |

FOREIGN PATENTS

| | | |
|---|---|---|
| 1,179,795 | France | May 28, 1959 |

UNITED STATES PATENT OFFICE

CERTIFICATE OF CORRECTION

Patent No. 3,144,639 August 11, 1964

André Michel Richard et al.

It is hereby certified that error appears in the above numbered patent requiring correction and that the said Letters Patent should read as corrected below.

Column 3, line 58, for "characteristics" read -- characteristic --; column 4, line 34, for "not" read -- no --; line 44, for "FIG. 3" read -- FIG. 9 --; line 52, strike out "interconnecting to"; column 7, line 3, for "as", second occurrence, read -- be --; column 12, line 46, for "(x.y.z)" in italics, read -- (x+y+z) --, in italics.

Signed and sealed this 1st day of June 1965.

(SEAL)
Attest:

ERNEST W. SWIDER
Attesting Officer

EDWARD J. BRENNER
Commissioner of Patents